US007605782B2

(12) United States Patent
Park

(10) Patent No.: US 7,605,782 B2
(45) Date of Patent: Oct. 20, 2009

(54) METHOD AND APPARATUS FOR ADJUSTING A BRIGHTNESS OF A DISPLAY SCREEN

(75) Inventor: Sung Jin Park, Kyunggi-Do (KR)

(73) Assignee: LG Electronics Inc., Seoul (KR)

( * ) Notice: Subject to any disclaimer, the term of this patent is extended or adjusted under 35 U.S.C. 154(b) by 1163 days.

(21) Appl. No.: 09/853,668

(22) Filed: May 14, 2001

(65) Prior Publication Data

US 2001/0040568 A1 Nov. 15, 2001

(30) Foreign Application Priority Data

May 15, 2000 (KR) .............................. 2000/25786

(51) Int. Cl.
*G09G 3/30* (2006.01)
*G09G 5/00* (2006.01)
*G06F 1/00* (2006.01)

(52) U.S. Cl. .......................... 345/77; 345/212; 713/323

(58) Field of Classification Search ................. 345/211, 345/212, 87, 102, 419–443, 77; 713/300, 713/310, 320–340
See application file for complete search history.

(56) References Cited

U.S. PATENT DOCUMENTS 5,386,577 A * 1/1995 Zenda ........................ 713/340
5,936,608 A * 8/1999 Springer ..................... 345/690
5,954,820 A * 9/1999 Hetzler ....................... 713/323
6,018,803 A * 1/2000 Kardach ..................... 713/323

OTHER PUBLICATIONS

McFedries, Paul, Windows 98 Unleashed, May 12, 1998, website, http://proquest.safaribooksonline.com/0672312352, hand numbered pp. 1-16.*

* cited by examiner

*Primary Examiner*—Srilakshmi K Kumar
(74) *Attorney, Agent, or Firm*—Ked & Associates LLP

(57) ABSTRACT

A method and apparatus are provided for adjusting the brightness of a display screen, such as an LCD screen. The method and apparatus are capable of reducing power consumption of the display in a system by determining whether a video intensive operation is being performed on the basis of various parameters such as a CPU usage, operation key words, operation of memory devices such as a hard disk or a CD-ROM device, etc. The method and apparatus adjust the brightness of the display screen an appropriate amount in accordance with the machine's use without user input, and without interfering with video intensive processes.

54 Claims, 9 Drawing Sheets

METHOD AND APPARATUS FOR ADJUSTING A BRIGHTNESS OF A DISPLAY SCREEN

BACKGROUND OF THE INVENTION

1. Field of the Invention

The present invention relates to a method and apparatus for adjusting a brightness of a display screen. More particularly, the invention relates to a method and apparatus for adjusting the brightness of a display screen, such as a LCD (Liquid Crystal Display) screen, based on whether an apparatus to which the display screen is connected, such as a computer, is performing display intensive operations, as determined, for example, by CPU usage amount, type of CPU usage, or usage of peripheral devices, such as a modem or memory device.

2. Background of the Related Art

FIG. 1A shows an example of a system which may utilize a typical method for adjusting a brightness of a display screen. In this example, the system is a laptop computer 10, with an LCD display screen 30. The laptop computer 10, has a port 20, to receive the output of an AC adapter 90. The laptop computer 10 is also provided with a battery 100, as an internal source of power. User signal inputs are entered into the system through a keyboard 60 and a mouse 70. The laptop computer 10 may incorporate various memory devices such as an internal hard disk drive 80, an external hard disk drive 110, a CD-ROM or DVD drive 40, and a modem 50.

FIG. 1B is a flow chart illustrating a typical method for adjusting a brightness of a LCD screen or other type of display screen in accordance with the related art. According to the method illustrated in FIG. 1, a brightness of a LCD screen is adjusted in accordance with a type of power source of the machine, such as an internal power source or an external power source. After the computer system is turned "ON" in step S10, a central process unit (CPU) to which the LCD screen or other type of display screen is connected executes instructions to determine whether the power supplied to the system is supplied through an external power source, such as an AC adapter, or by an internal power source, such as a battery, in step S11. If it is determined in step S11 that power is supplied to the system through an external power source, the brightness of the LCD screen or other type of display screen is maintained at its optimum viewing brightness in step S12. If it is determined in step S1 1 that power is supplied to the system from an internal source, such as a battery, the brightness of the LCD screen or other type of display screen is reduced in step S13. In other words, when the system is being powered by a limited power source, such as a battery, the brightness of the LCD screen or other type of display screen can be reduced to conserve power.

An operating system used by the CPU, for example, Windows 98, may include a function for determining whether the CPU is in use. When the user does not operate the computer for a pre-determined period of time, the computer switches into a power save mode automatically in accordance with settings chosen by the user to further reduce power consumption. Such a determination can be based on lack of user input, such as from a mouse or keyboard.

However, in the related art as described above, when the user watches a movie on the computer by executing a video file or an internet broadcast, because there are no inputs from the mouse or keyboard, the operating system determines the computer is not in use. The operating system thus dims the display screen and the user can not watch the movie. In addition to dimming the screen, to further conserve power when the user does not use a user signal input apparatus, such as a keyboard or mouse, the system is converted from an "ON" state into an "IDLE" state, in which state the clock rate of the CPU is reduced. With the clock rate reduced, the display screen image is not updated as frequently, and the video impaired. However, despite no keyboard or mouse activity, the user may be using the machine to watch, for example, a movie or an internet broadcast, and not want reduced video performance.

SUMMARY OF THE INVENTION

An object of the invention is to solve at least the above problems and/or disadvantages and to provide at least the advantages described hereinafter.

Another object of the invention is to provide a method for adjusting a brightness of a display screen, for example, a LCD screen, without interfering with use of the apparatus connected to the display screen for watching a movie or some other display intensive operation. This may be accomplished by determining whether an operation related to a video file is being performed. The determination may be made based on various parameters, such as CPU usage, retrieval of a current CPU process name, operations of a read/write apparatus, such as a hard disk or a CD-ROM (Compact Disk Read Only Memory), using a modem, etc.

Another object of the invention is to provide a method for adjusting a brightness of a display screen based on CPU usage to thereby reduce a power consumption of the computer system.

Another object of the invention is to provide a method for adjusting the brightness of a display screen, which is capable of preventing the display screen from dimming while watching, for example, a movie or video. This may be accomplished by adjusting the brightness of the display screen an appropriate amount after measuring CPU usage of the system during a period in which a user does not use, for example, a keyboard or a mouse etc.

In general, this method may be applied to any system or machine incorporating a display screen. On example of a system using a display screen is a computer. For purposes of illustration herein, a portable computer incorporating an LCD screen and capable of running off an internal battery is used in the description. However, any machine using any type of display, such as a cathode ray tube, plasma display, projection display, etc., may use the invention.

In order to achieve these and other objects of the invention, there is provided a method for adjusting a brightness of a liquid crystal display screen of a system, the method including determining whether there are user signal inputs, switching the system into an IDLE mode if there are no user signal inputs, determining central processing unit usage when in the IDLE mode, and adjusting the brightness of the liquid crystal display screen when in the IDLE mode based on central processing unit usage.

To further achieve these and other objects of the invention, there is provided a method for reducing electrical power consumed by a central processing unit controlled display screen, the method including determining central processing unit activity, and dimming a brightness of the display screen when the central processing unit activity falls below a minimum threshold.

To further achieve these and other objects of the invention, there is provided a computer-readable medium having stored thereon a sequence of instructions which, when executed by a processor, cause the processor to perform the steps of monitoring a system for certain display related processes, maintaining the brightness of a display if the certain display related processes are running, and reducing the brightness of a display if the certain display related processes are not running.

To further achieve these and other objects of the invention, there is provided an apparatus for reducing electrical power consumed by a central processing unit controlled display screen the apparatus including means for determining central processor unit activity, and means for dimming a brightness of the display screen when the central processing unit activity falls below a minimum threshold.

To further achieve these and other objects of the invention, there is provided an apparatus for reducing the brightness of a display screen in a system in the absence of certain display related processes, the apparatus including means for monitoring a system for certain display related processes, means for maintaining the brightness of a display if certain display related processes are running, and means for reducing the brightness of a display if certain display related processes are not running.

To further achieve these and other objects of the invention, there is provided a method for adjusting a brightness of a display screen of a system, the method including monitoring the system for display related processes, maintaining the brightness of a display if display related processes are running, and reducing the brightness of a display if display related processes are not running.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The invention provides a method and apparatus for adjusting a brightness of a display screen, such as a LCD or other type of display screen. The LCD or other type of display screen is generally in communication with or included in a system, such as a computer having a central processing unit. Software or hardware may be provided that control system functions, and the method according to the invention may be incorporated into said software or hardware.

Figure 1A:
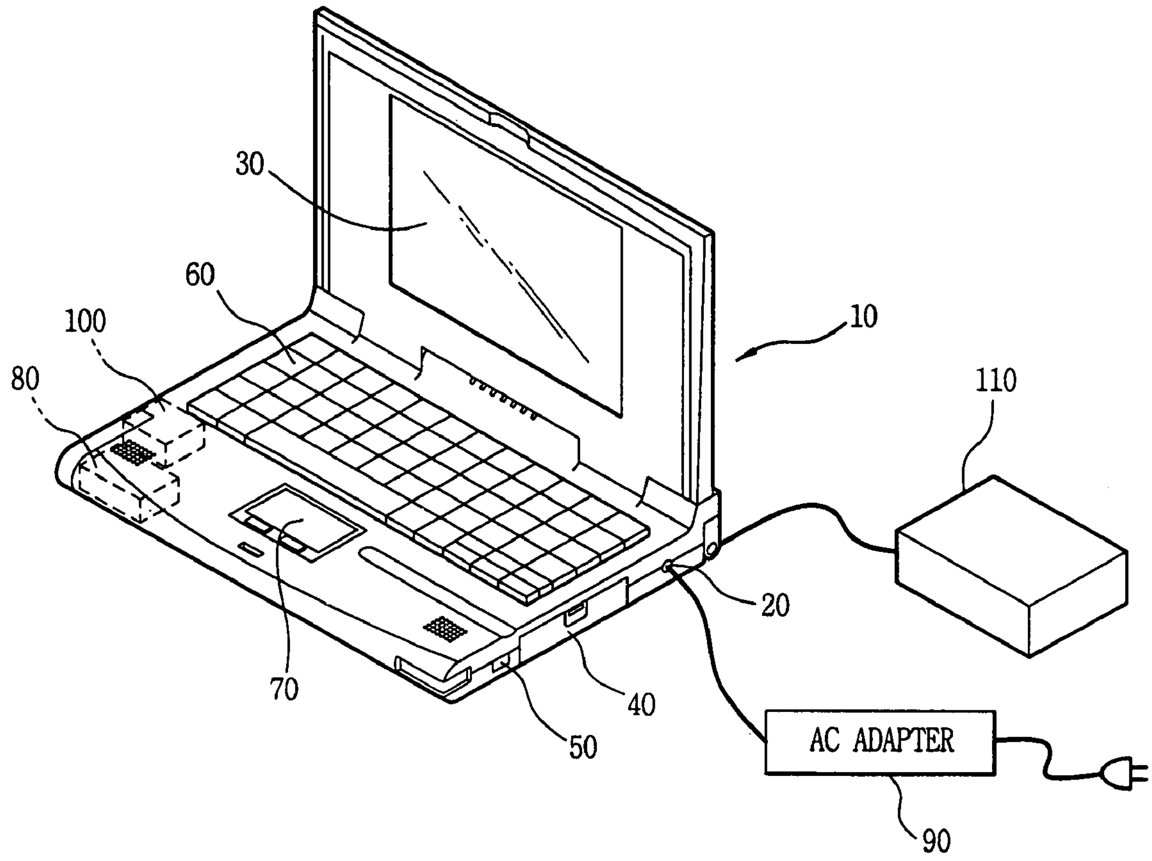
FIG. 1A RELATED ART
FIG. 1A is a side perspective view of a system which may utilize a typical method for adjusting a brightness of a display screen.
Figure 1B:
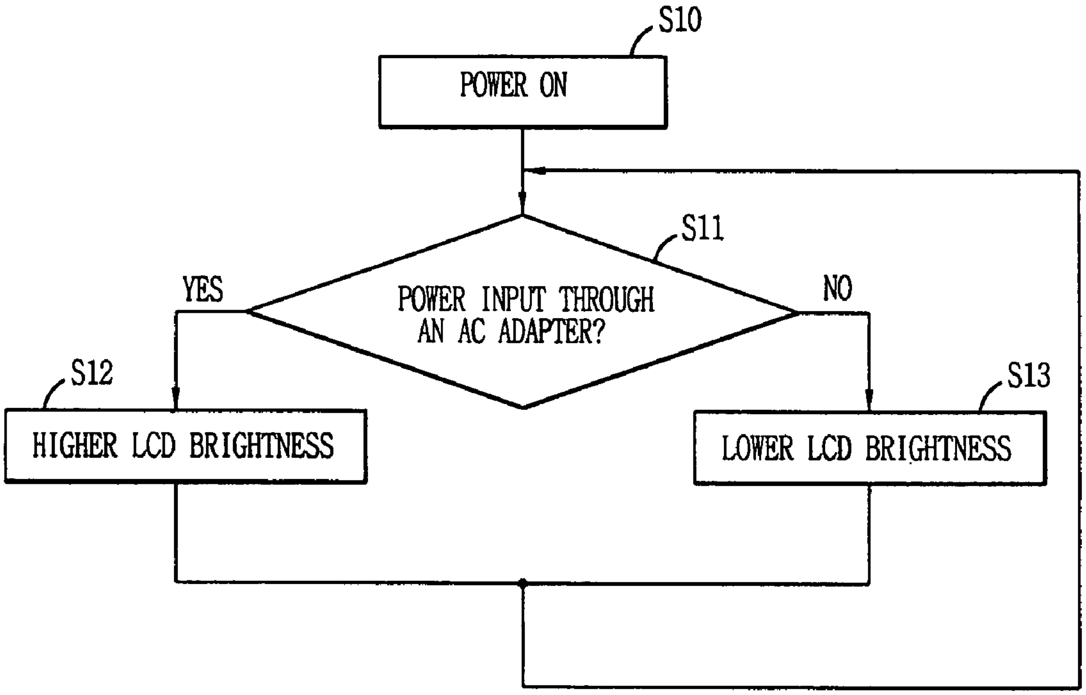
FIG. 1B RELATED ART
FIG. 1B is a flow chart illustrating a method for adjusting a brightness of a display screen in accordance with related art.
Figure 2A:
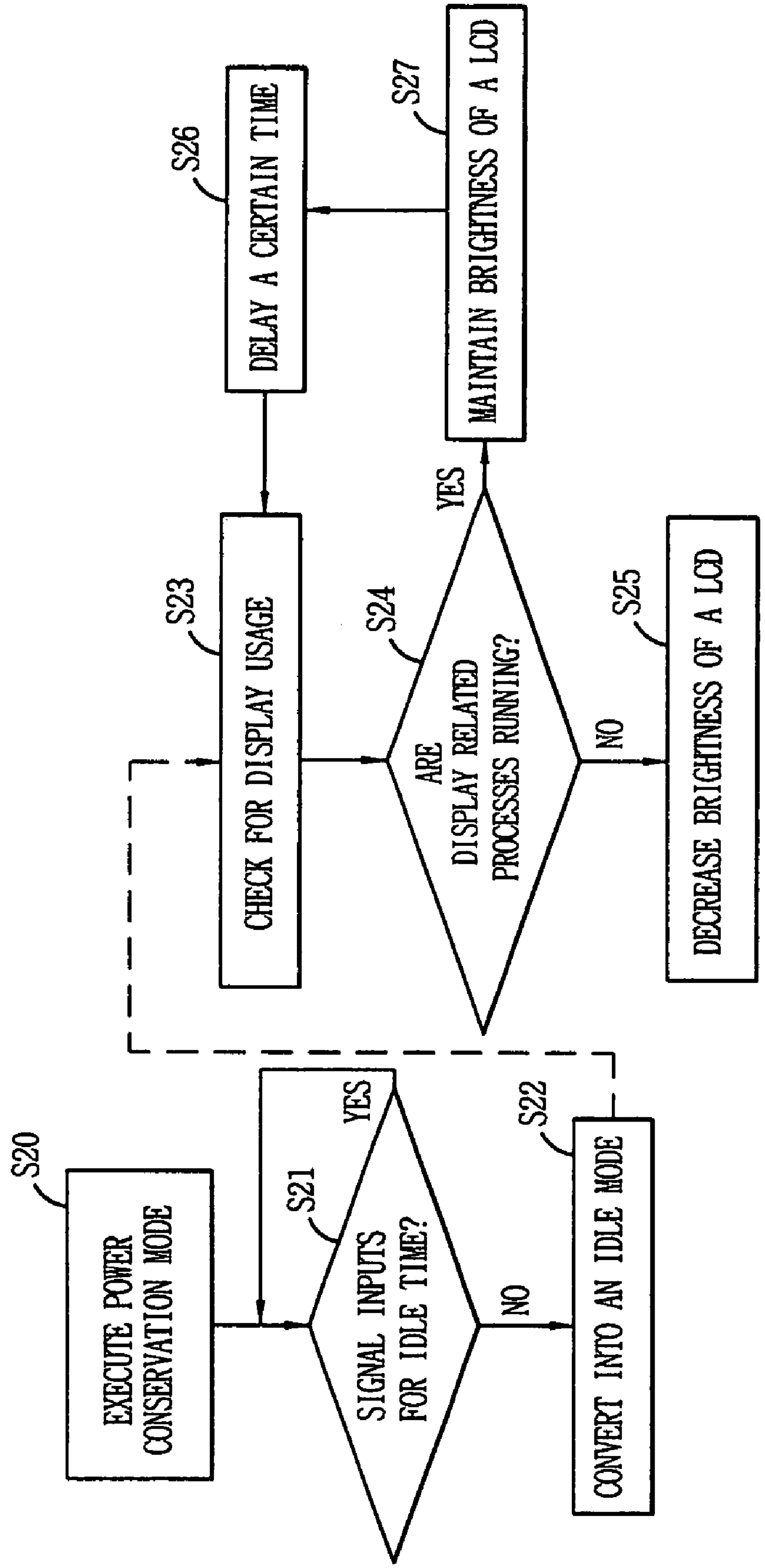
FIG. 2A is a flow chart illustrating a method according to one embodiment of the invention for adjusting a brightness of a display screen based certain parameters.

FIG. 2A is a flow chart illustrating a method for adjusting a brightness of a display according to one embodiment of the invention that relies, in part, on whether certain display related processes are being run by the apparatus. "Display related processes" may include any display intensive use of the computer where the user is watching a display screen of the apparatus. Display related processes may include watching a movie on the display screen, such as by playing a CD-ROM (Compact Disk Read Only Memory), DVD Digital Video Disk), MPEG (Moving Pictures Experts Group) file, downloading a video file from the internet or an internet broadcast, or similar type functions.

Depending upon whether display related processes are being run, a brightness of the display screen of the apparatus can be either maintained or reduced. In a first step (not shown), the CPU executes instructions to determine whether it is being powered by an internal power source, such as a battery. If the machine is being powered by an internal power source, the CPU executes instructions to switch the machine into a power conservation mode in step S20. While in the power conservation mode, in step S21 the CPU executes instructions to monitor the system for user inputs, such as signals from a keyboard or mouse. If the CPU detects user signal inputs, the machine continues to operate in the power conservation mode. If the CPU does not detect user signal inputs, the CPU executes instructions to switch the computer or machine into an "IDLE" mode in step S22.

While in the "IDLE" mode, in step S23 the CPU executes instructions to check whether the user is using the display screen of the apparatus. In general, to check for display usage, the CPU executes instructions to determine whether display related processes are running in the machine S24. Such display related processes can be indicative of intensive display use despite no user signal inputs, such as watching a movie or viewing an internet broadcast. If the CPU detects that display related processes are running, a brightness of the display screen is maintained in step S27. While maintaining brightness of the display screen, the CPU waits a predetermined period of time in step S26, and then checks for display usage again at step S23 by repeating the process for checking for display related processes in step S24. Alternatively, at step S24, if no display related processes are detected by the CPU, the CPU executes instructions to reduce the brightness of the display screen or shut down the display screen completely in step S25.

Figure 2B:
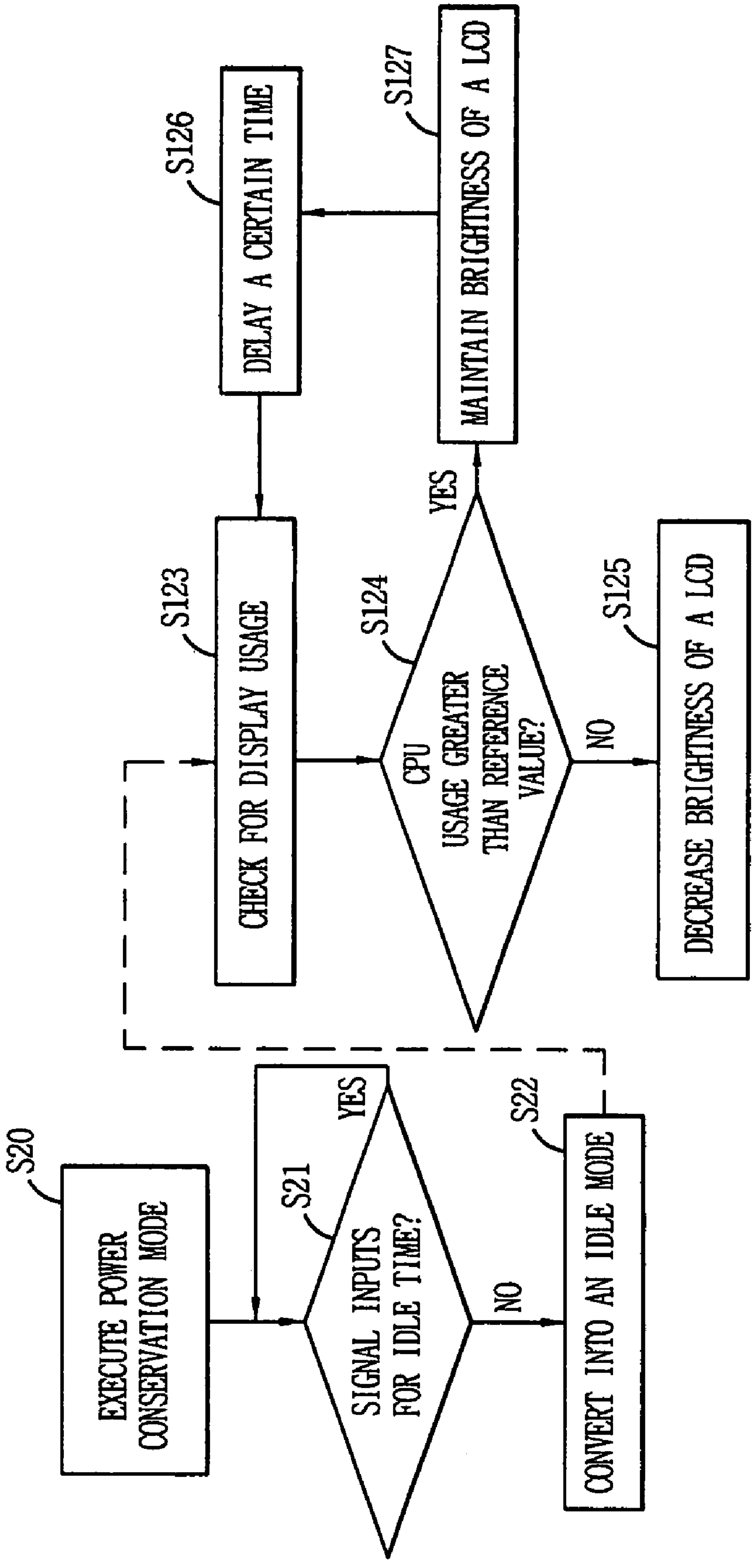
FIG. 2B is a flow chart illustrating according to another embodiment of the invention for adjusting a brightness of a display screen based on a quantity of the machine's CPU usage.

FIG. 2B is a flow chart that illustrates a method for adjusting a brightness of a display screen according to another embodiment of the invention based on a quantity of the CPU usage of the apparatus. The steps of the embodiment of FIG. 2B are similar to the steps of the embodiment of FIG. 2A and like description has been omitted. Like reference numerals have been used to depict like steps. In this embodiment, when the system is in the "IDLE" mode, the quantity of usage of the CPU is measured in step S123. For example, when running the "Windows" operating system, CPU usage can be determined from the information found in the HKEY_DYN_DATA\PerfStats\StatData registry.

Based on the amount of CPU usage, in step S124 it is determined whether the quantity of CPU usage is greater than a reference or threshold quantity. The reference quantity of CPU usage can be chosen by the user, or can be a default value preset within the system. For example, where the maximum quantity of usage of the CPU is 100%, the reference quantity to switch into "IDLE" mode can be set generally not greater than 30%. This reference or threshold value can be automatically adjusted based on the type of application being run by the CPU.

When the quantity of CPU usage is less than the reference quantity, the LCD screen may be dimmed in step S125. In the alternative, when it is determined in step S124 that the quantity of CPU usage is greater than the reference quantity, it is determined that the user is performing an operation requiring substantial CPU time, such as viewing a movie or an internet broadcast. In this case, the brightness of the LCD screen is maintained in step S127. Therefore, although the user does not operate the keyboard or mouse etc., the brightness of the LCD screen is maintained.

After the LCD is dimmed or powered off, in order to determined whether a process requiring substantial CPU usage begins, in step S126 CPU usage is monitored by periodically checking usage at predetermined time intervals.

Figure 2C:
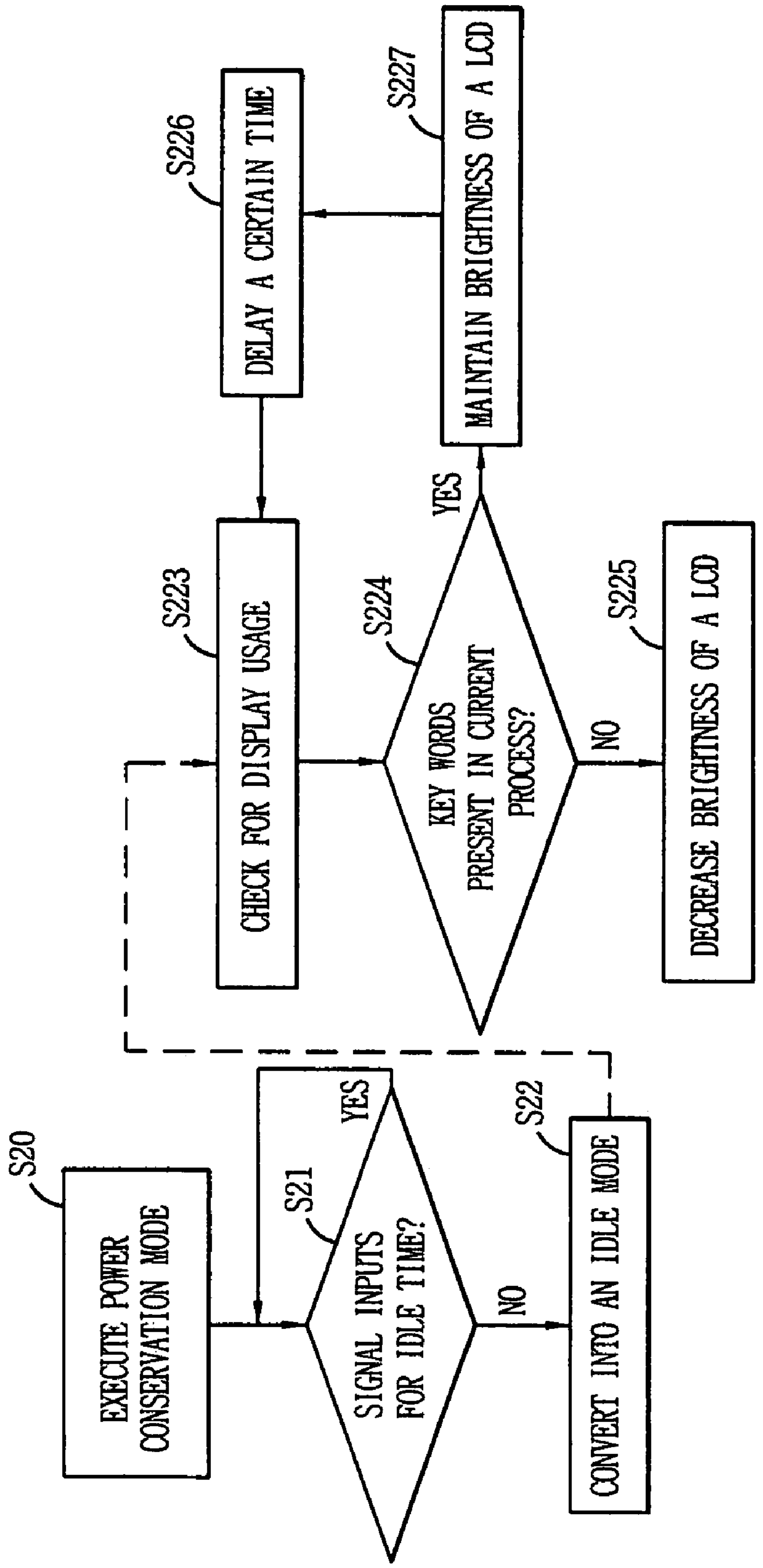
FIG. 2C is a flow chart illustrating a method according to still another embodiment of the invention for adjusting a brightness of a display screen based on whether certain key words appear in operations being executed by the CPU.

FIG. 2C is a flow chart that illustrates a method for adjusting a brightness of a display screen according to another embodiment of the invention based on the processes being run by the CPU. The steps of the embodiment of FIG. 2C are similar to the steps of the embodiments of FIGS. 2A and 2B, and like description has been omitted. Like reference numerals have been used to depict like steps.

In this embodiment, when the system is in the "IDLE" mode, the CPU executes instructions to determine whether the display is being used by the user in step S223. In this embodiment, to check for display usage, the CPU executes instructions to check for certain key words that are contained in the operating instructions in the process that the CPU is running, step S224. The keywords that the CPU looks for are those keywords that indicate a display intensive process is being executed by the apparatus, such as when the user is watching a movie or viewing an Internet broadcast.

If the CPU detects certain keywords in step S224, the CPU executes instructions to maintain the brightness of the display screen in step S227. After a certain period of time, the CPU executes instructions to check again for display usage by looking for keywords in the process in step S226. By periodically checking for key words in this manner, the apparatus according to the invention is capable of monitoring screen usage and maintaining the screen's brightness accordingly. Alternatively, if the CPU does not detect certain keywords in the process in step S224, the CPU executes instructions to dim the brightness of the display screen or power it down in step S225.

Figure 2D:
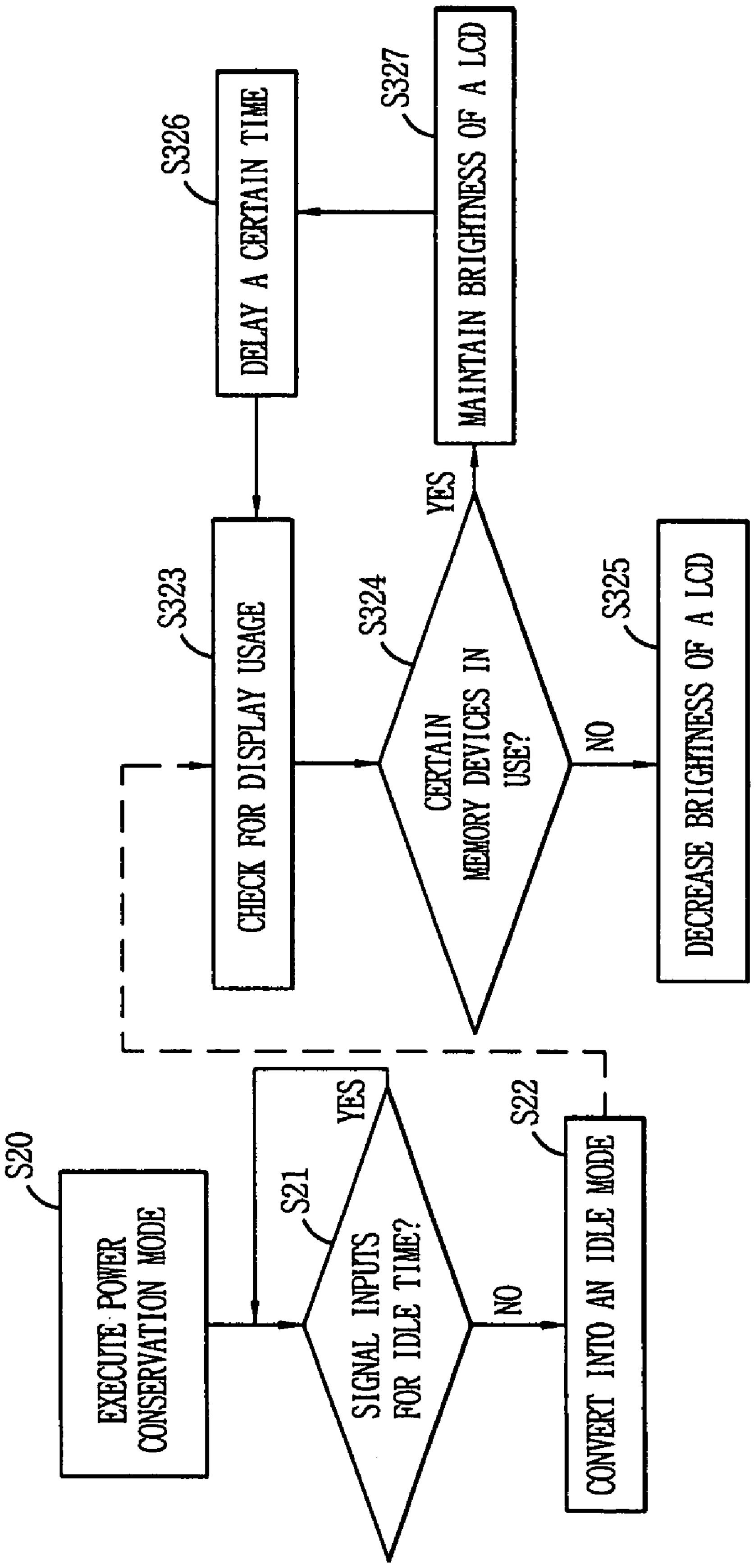
FIG. 2D is a flow chart illustrating a method according to yet another embodiment of the invention for adjusting a brightness of a display screen based on whether certain memory devices are in use.

FIG. 2D is a flowchart that illustrates a method for adjusting a brightness of a display screen according to another embodiment of the invention based on whether certain memory devices are in use. The steps of the embodiment of FIG. 2D are similar to the steps of the embodiments of FIGS. 2A-2C, and description has been omitted. Like reference numerals have been used to depict like steps.

In this embodiment, when the system is in "IDLE" mode, the CPU executes instructions to check for display usage in step S323. In this embodiment, the CPU checks for display screen usage by determining whether certain memory devices related to screen operations are in use in step S324. The memory devices can include, for example, the computer's internal hard drive, or external memory devices.

If certain memory devices are in use, the CPU maintains the brightness of the display screen in step S327. After a predetermined delay, the CPU executes instructions to check for display usage again in step S326. Alternatively, in step S324, if the CPU determines that certain memory devices are not in use in step S324, the CPU executes instructions to decrease the brightness of the display screen or to turn it off in step S325.

Figure 2E:
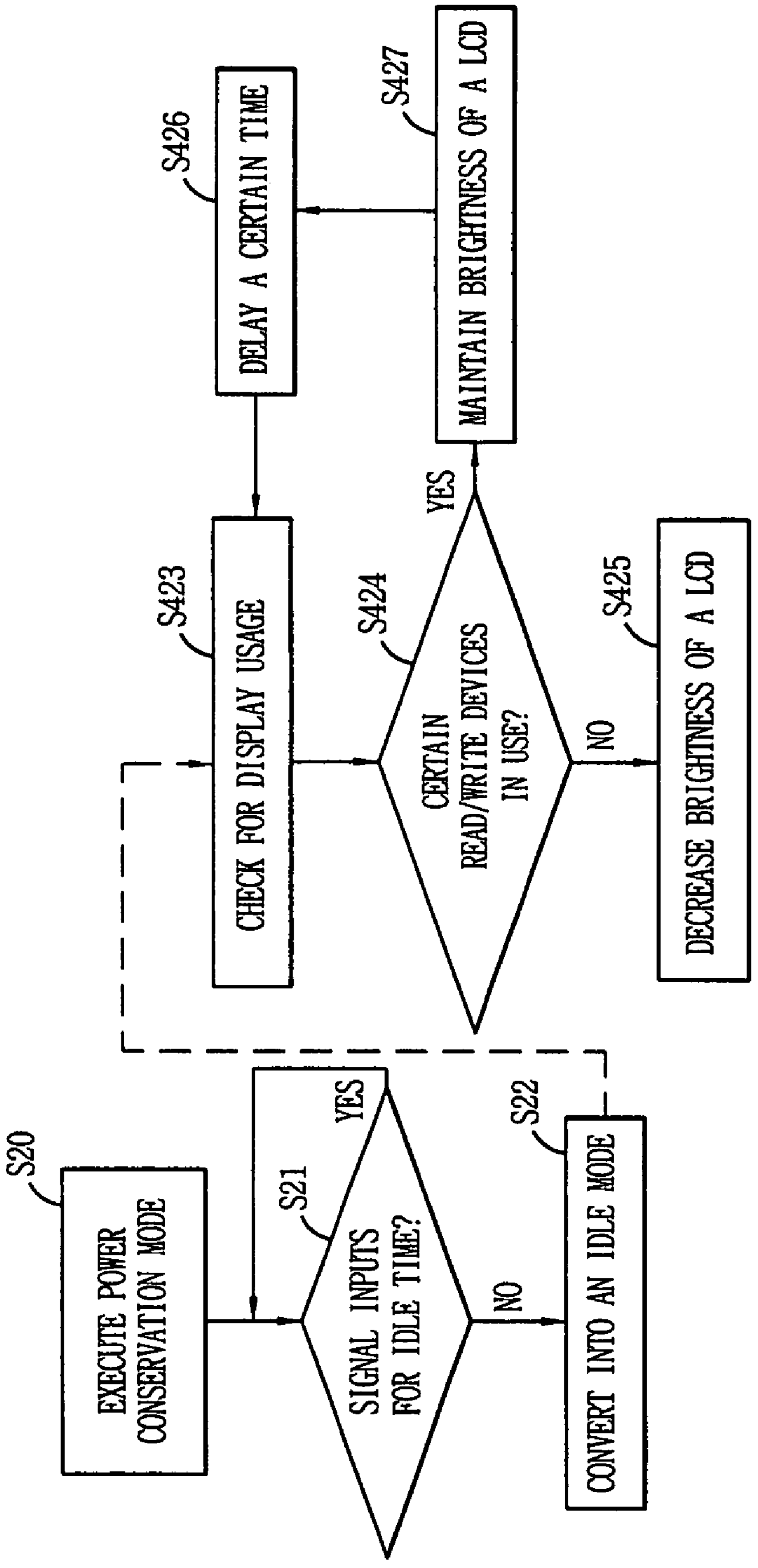
FIG. 2E is a flow chart illustrating a method according to an additional embodiment of the invention for adjusting a brightness of a display screen based on whether certain read/write devices are in use.

FIG. 2E is a flowchart that illustrates a method for adjusting a brightness of a display screen according to another embodiment of the invention based on whether certain read/write devices are in use. The steps of the embodiment of FIG. 2E are similar to the steps of the embodiments of FIGS. 2A-2D, and description has been omitted. Like reference numerals have been used to depict like steps.

In this embodiment, when the system is in the "IDLE" mode, the CPU executes instructions to check for display usage in step S423. The CPU checks for display usage by executing instructions to determine whether certain read/write devices related to screen usage are in use in step S424. Read/write devices may include, for example, an external hard drive, a CD ROM (Compact Disk read Only Memory) drive, a DVD (Digital Video Disk), etc.

If the CPU determines that certain read/write devices are in use, the CPU maintains the brightness of the display screen in step S427. After a certain period of time, the CPU executes instructions to once again check for display usage in step S426. Alternatively, in step S424, if the CPU determines that certain read/write devices are not in use, the CPU executes instructions to decrease the brightness of the display screen or turn it off in step S425.

Figure 2F:
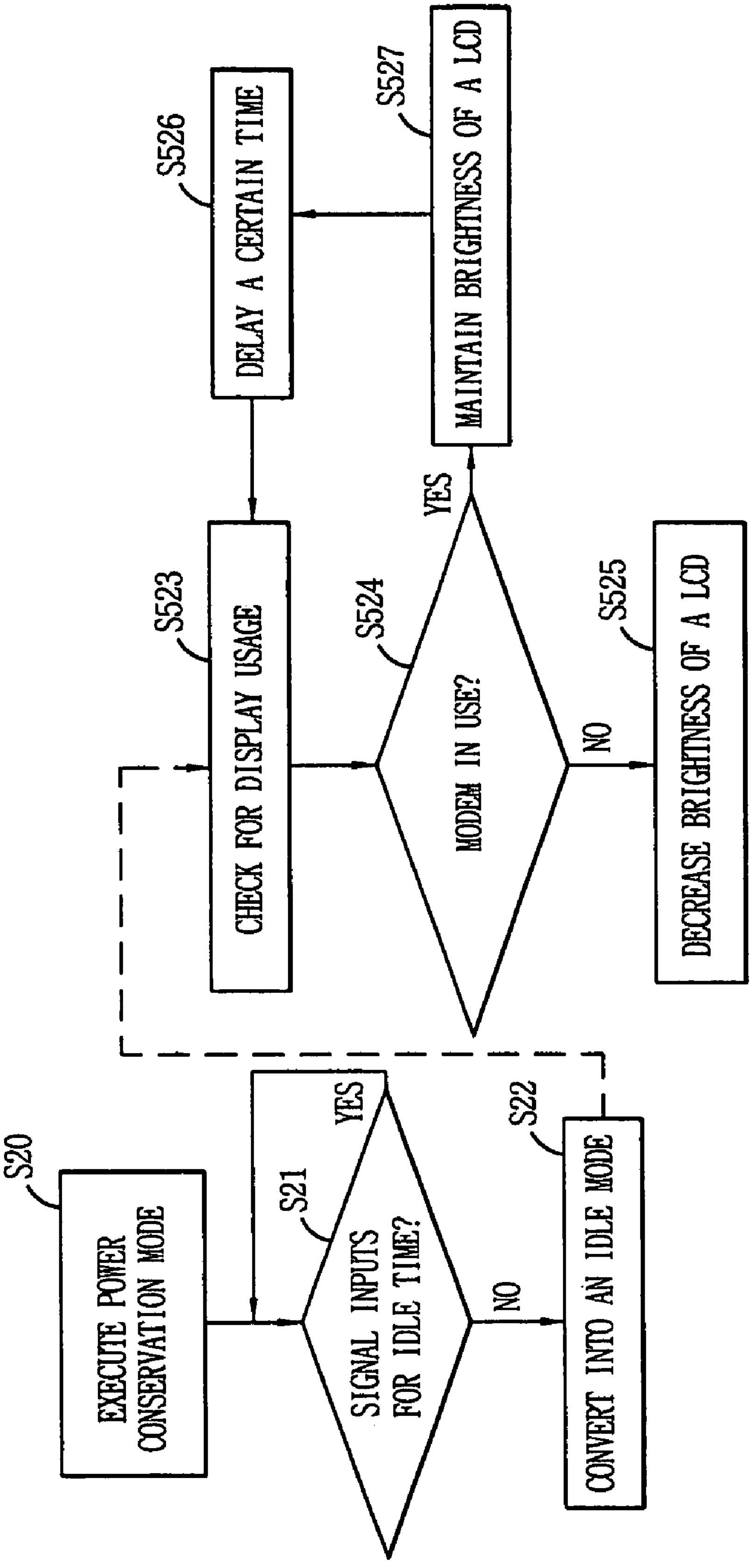
FIG. 2F is a flow chart illustrating a method according to another embodiment of the invention for adjusting a brightness of a display screen based on whether a modem is in use.

FIG. 2F is a flowchart that illustrates a method for adjusting a brightness of a display screen according to another embodiment of the invention based on whether a modem is in use. The steps of the embodiment of FIG. 2F are similar to the steps of the embodiments of FIGS. 2A-2E, and description has been omitted. Like reference numerals have been used to depict like steps.

In this embodiment, when the system is in the "IDLE" mode, the CPU executes instructions to check for display screen usage in step S523. The checking for display screen usage involves the CPU executing instructions to determine whether a modem is in use in step S524, such as when the user is watching a video broadcast over the internet.

If the CPU determines that a modem is in use in step S524, the CPU executes instructions to maintain the brightness of the display screen, step S527. The CPU then waits a certain period of time and checks again for display usage in step S526. Alternatively, if the CPU determines that a modem is not being used in step S524, the CPU executes instructions to decrease the brightness of the display screen or turn it off in step S525.

Figure 3:
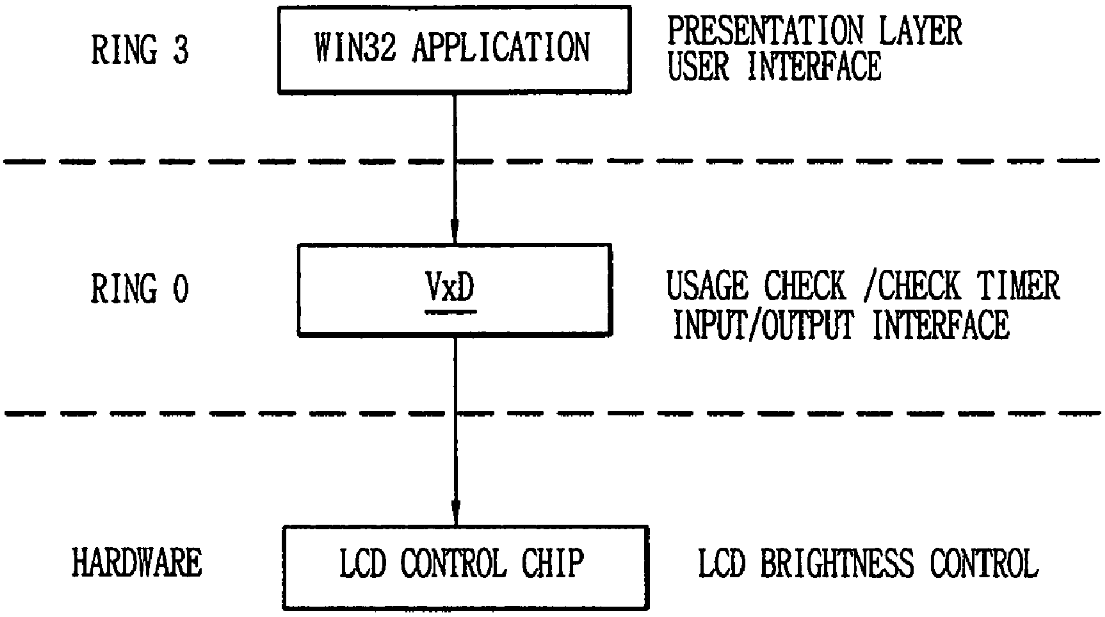
FIG. 3 is a block diagram illustrating the role at each hierarchy of a computer when a device driver to interface between a user and the hardware is produced in accordance with an embodiment of the invention.

FIG. 3 is a block diagram illustrating the role at each hierarchy of a system when a device driver is designed in accordance with embodiments of the invention. For purposes of illustration, FIG. 3 shows an embodiment running WIN32 operating system. It should be noted that the invention can function with any operating system. As depicted in FIG. 3, a ring 0 hierarchy performs a middle role for controlling hardware based on user inputs from a user program. In this example, the hierarchy adapts a device driver to receive user inputs to control power conservation functioning. For example, in Windows ME 98, ring 0 would adapt the Virtual Device Driver to the user interface. As another example, in Windows NT/2000, ring 0 would adapt the Windows Driver Model to the user interface.

The ring 3 hierarchy is for a user interface and can be a program for adjusting/setting the initial brightness of the LCD screen or other type of display screen for viewing brightness and power conservation. When information entered at the ring 3 hierarchy by a user is transmitted to a disk driver of the ring 0 hierarchy and the system is converted into the “IDLE” mode, the device driver determines the brightness of the LCD screen or other type of display screen based on various parameters such as CPU usage, and transmits instructions to a control chip through an input/output port. Accordingly, the brightness of the LCD screen or other type of display screen is adjusted by the control chip in accordance with the instructions.

While the computer is in the “IDLE” mode, the type of process the CPU is running is determined. For example, whether the user is watching moving pictures or other display intensive processes is determined on the basis of CPU usage as determined from information from the appropriate operating system registry. In another embodiment, a keyword typically appears in a video player file, such as a Digital Video Disk, or Moving Picture Expert Group, etc., and can be retrieved from the current operating process name from the operating system. Other examples include basing the decision on memory devices in use, read/write hardware or modem use. Such information is used to more accurately determine whether the user is running display intensive operations such as watching a movie, and would prefer the display screen at a useful brightness level.

In addition, the quantity of CPU usage can be determined more accurately by judging whether a hard disk drive storing a video file, a Compact Disk Read Only Memory device, a Digital Video Disk Read Only Memory device or a modem downloading an internet broadcast, for example, is in operation. Such information can be included in the determination to avoid dimming the LCD or other type of display screen at inappropriate times such as when the user is watching a movie.

As described above, the invention is capable of preventing the LCD screen from dimming when the user watches a movie by adjusting the brightness of the LCD screen or other type of display screen based on certain parameters when the user does not use the keyboard or the mouse while watching the movie or other video intensive process.

In addition, the invention is capable of reducing the power consumption of the system by determining whether a video intensive operation is being performed based various parameters such as the retrieval of the current process name, operation of a hard disk or other memory device, such as a CD-ROM, etc., or modem use, and by adjusting the brightness of the display screen accordingly. Such adjustments can be made independent of keyboard or a mouse inactivity when the system is converted from the “ON” state into an “IDLE” mode.

In addition, the invention is capable of increasing battery life for an apparatus, such as a note-book or lap top computer, by reducing power consumption by adjusting the brightness of the LCD screen during video inactivity.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for adjusting a brightness of a display screen of a display of a system, the method comprising:

determining whether a processor is being powered by an internal power source;

switching the system into a power conservation mode if the processor is being powered by an internal power source determining whether there is a user signal input into the system;

switching the system into an IDLE mode if there is no user signal input;

determining whether at least one of certain display related processes is running when in the IDLE mode;

maintaining the brightness of the display screen and periodically checking whether at least one of the certain display related processes is running, if at least one of the certain display related processes is running;

checking processor usage if at least one of the certain display related processes is not running; and adjusting the brightness of the display screen when in the IDLE mode based on processor usage without turning the display screen off, wherein the certain display related processes are indicative of a user watching a video or program on the display screen, and wherein the certain display related processes include at least one of:

playing a CD-ROM;

playing a DVD;

playing a MPEG file; or playing a video file.

2. The method according to claim 1, wherein checking processor usage comprises determining a content of a registry of an operating system of the system.

3. The method according to claim 2, wherein the registry comprises HKEY_DYN_DATA\PerfStats\StatData.

4. The method of claim 1, wherein checking processor usage comprises retrieving a keyword from an operating system that appears when a video file is read by the system.

5. The method according to claim 1, wherein checking processor usage comprises measuring a processor usage amount, and reducing the brightness of the display screen if the processor usage amount is below a threshold value.

6. The method according to claim 1, wherein checking processor usage comprises determining whether the display screen is displaying a movie.

7. The method according to claim 6, wherein determining whether the display screen is displaying a movie comprises determining whether a memory device connected to the processor is operating.

8. The method according to claim 7, wherein the memory device comprises a hard disk.

9. The method according to claim 7, wherein the memory device comprises a CD-ROM.

10. The method according to claim 7, wherein the memory device comprises a DVD.

11. The method according to claim 6, wherein die brightness of the display screen is reduced if the display screen is not displaying a movie.

12. The method according to claim 6, wherein the brightness of the display screen is maintained if the display screen is displaying a movie.

13. The method according to claim 1, wherein the display is a liquid crystal display screen.

14. A computer-readable medium having stored thereon a sequence of computer executable instructions which, when executed by a processor, cause the processor to perform the steps of:

monitoring a system to determine whether at least one of certain display related processes is running;

maintaining a brightness of a display screen of a display and periodically checking whether at least one of the certain display related processes is running if at least one of the certain display related processes is running; and reducing the brightness of the display screen if at least one of the certain display related processes is not running without turning the display screen off, wherein the certain display related processes include at least one of:

playing a CD-ROM;

playing a DVD;

playing a MPEG file; or playing a video file.

15. The computer readable medium of claim 14, wherein the system is a computer.

16. The computer readable medium of claim 14, wherein the display is a liquid crystal display screen.

17. The computer readable medium of claim 14, further having stored thereon a sequence of instructions which, when executed by a processor, cause the processor to perform the step of monitoring for user input signals.

18. The computer readable medium of claim 14, further having stored thereon a sequence of instructions which, when executed by a processor, cause the processor to perform the step of determining whether the system is powered by an internal power source.

19. The computer-readable medium of claim 14, wherein the monitoring step comprises determining a processor usage amount, and comparing said processor usage amount against a reference amount.

20. The computer-readable medium of claim 19, wherein the reference amount is controllably variable.

21. The computer-readable medium of claim 19, wherein determining a processor usage amount comprises determining information contained in a registry.

22. The computer-readable medium of claim 21, wherein the registry comprises HKEY_DYN_DATA\PerfStats\StatData.

23. The computer-readable medium of claim 14, wherein the monitoring comprises determining whether a video process related keyword is contained in a currently operating process.

24. The computer-readable medium of claim 14, wherein the monitoring comprises determining whether a video process related device is in use.

25. The computer-readable medium of claim 24, wherein the video process related device comprises a readable-and-writeable memory device.

26. The computer-readable medium of claim 25, wherein the read-only memory device comprises a CD-ROM.

27. The computer-readable medium of claim 25, wherein the read-only memory device comprises a DVD.

28. The computer-readable medium of claim 24, wherein the video process related device comprises a read-only memory device.

29. The computer-readable medium of claim 24, wherein the video process related device comprises a modem.

30. The computer-readable medium of claim 14, wherein the monitoring comprises:

determining a processor usage amount and comparing said processor usage amount against a reference amount;

determining whether a video process related keyword is contained in the currently operating process; and determining whether a video process related device is in use.

31. A method for reducing electrical power consumed by a processor controlled display screen, the method comprising:

checking display screen usage by determining whether a certain device related to screen operation is in use;

maintaining a brightness of the display screen if the certain device is in use, and checking the display usage by determining whether the certain device is in use after a predetermined delay; and reducing the brightness of the display screen or turning the display screen off if the certain device is not in use, wherein the certain device includes at least one of:

a device for playing a CD-ROM;

a device for playing a DVD;

a device for playing a MPEG file; or a device for playing a video file.

32. The method according to claim 31, wherein the certain device comprises a memory device.

33. The method according to claim 31, wherein the certain device comprises a readable and writable device.

34. An apparatus for reducing electrical power consumed by a processor controlled display screen, the apparatus comprising:

a processor comprising:

means for checking display screen usage by determining whether a certain device related to screen operation is in use;

means for maintaining a brightness of the display screen if the certain device is in use, and checking the display usage by determining whether the certain device is in use after a predetermined delay; and means for reducing the brightness of the display screen or turning the display screen off if the certain device is not in use, wherein the certain device includes at least one of:

a device for playing a CD-ROM;

a device for playing a DVD;

a device for playing a MPEG file; or a device for playing a video file.

35. The apparatus according to claim 34, wherein the certain device comprises a memory device.

36. The apparatus according to claim 34, wherein the certain device comprises a readable and writable device.

37. An apparatus, comprising:

a processor comprising:

means for monitoring a system to determine whether at least one of certain display related processes is running;

means for maintaining a brightness of a display screen of a display and periodically checking whether at least one of the certain display related processes is running if at least one of the certain display related processes is running; and means for reducing the brightness of the display screen if at least one of certain display related processes is not running without turning the display screen off, wherein the certain display related processes include at least one of:

playing a CD-ROM;

playing a DVD;

playing a MPEG file; or
playing a video file.

38. A method for adjusting a brightness of a display screen of a display of a system, the method comprising:

monitoring the system to determine whether at least one of certain display related processes is running;

maintaining the brightness of the display screen and periodically checking whether at least one of the certain display related processes is running if at least one of the certain display related processes is running; and reducing the brightness of the display screen if at least one of the certain display related processes is not running without turning the display screen off, wherein the certain display related processes include at least one of:

playing a CD-ROM;
playing a DVD;
playing a MPEG file; or
playing a video file.

39. The method according to claim 38, wherein the system is a computer.

40. The method according to claim 38, wherein the display is a liquid crystal display screen.

41. The method according to claim 38, further comprising: monitoring for user input signals.

42. The method according to claim 38, further comprising: determining whether the system is powered by an internal power source.

43. The method according to claim 38, wherein the monitoring comprises determining a processor usage amount, and comparing said processor usage amount against a reference amount.

44. The method according to claim 43, wherein the reference amount is controllably variable.

45. The method according to claim 43, wherein determining a processor usage amount comprises determining information contained in a registry.

46. The method according to claim 45, wherein the registry comprises HKEY_DYN_DATA\PerfStats\StatData.

47. The method according to claim 38, wherein the monitoring comprises determining whether a video process related keyword is contained in the currently operating process.

48. The method according to claim 38, wherein the monitoring comprises determining whether a video process related device is in use.

49. The method according to claim 48, wherein the video process related device comprises a readable-and-writeable memory device.

50. The method according to claim 48, wherein the video process related device comprises a read-only memory device.

51. The method according to claim 50, wherein the read only memory device comprises a CD-ROM.

52. The method according to claim 50, wherein the read-only memory device comprises a DVD.

53. The method according to claim 48, wherein the video process related device comprises a modem.

54. The method of claim 38, wherein the monitoring comprises:

determining a processor usage amount and comparing said processor usage amount against a reference amount;

determining whether a video process related keyword is contained in the currently operating process; and determining whether a video process related device is in use.

* * * * *